Oct. 4, 1927.

G. H. STILES 1,643,963

VEHICLE LAMP

Original Filed July 20, 1925

Inventor
George H. Stiles
By Herbert E. Smith
Attorney

Patented Oct. 4, 1927.

1,643,963

UNITED STATES PATENT OFFICE.

GEORGE H. STILES, OF SPOKANE, WASHINGTON.

VEHICLE LAMP.

Application filed July 20, 1925, Serial No. 44,723. Renewed March 15, 1927.

My present invention relates to improvements in vehicle lamps adapted for use either as a headlight for antomotive vehicles, or as an auxiliary to the usual headlights employed on automobiles.

The lamp is designed for attachment to a convenient supporting part of the vehicle, as for instance to the standard beneath the radiator cap, and may be permanently adjusted with relation thereto, and in addition the lamp may be adjusted by manual control from the dashboard or instrument board of the automobile, for the purpose of directing its light rays below a horizontal plane to avoid danger to the occupants of an approaching vehicle while traveling at night.

The invention consists in certain novel combinations and arrangements of parts involving a concentric casing and reflector with means for rotatively adjusting the latter within the former, as will hereinafter be more fully pointed out and claimed.

In the accompanying drawings I have illustrated one complete example of the physical embodiment of my invention in which the lamp is supported from the radiator cap of an automobile, and in which the parts are combined and arranged according to the best mode I have thus far devised for the practical application of the principles of my invention. It will be understood that the lamp or headlight may be attached to any other suitable supporting part of the automobile.

Figure 1:
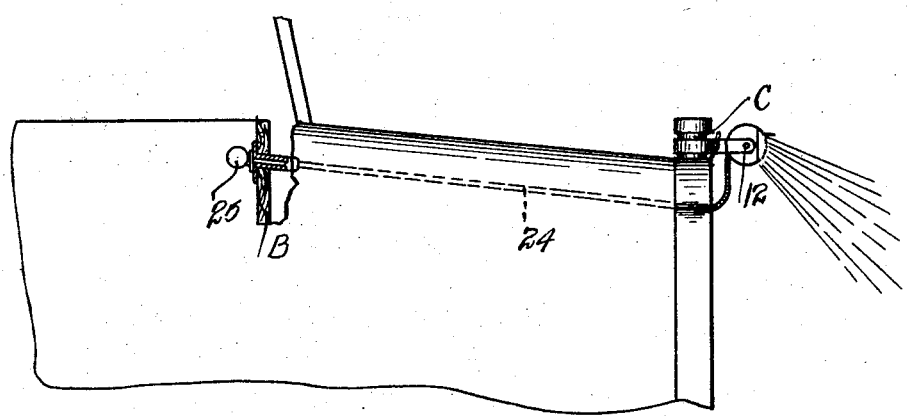
Figure 1 is a view in side elevation of so much of an automobile as is necessary to illustrate the utility and adaptation of my invention.

In carrying out my invention I utilize a reflecting cylinder 1, preferably of metal and provided with closed ends, the interior surface 2 of the cylinder being used as a reflecting surface for light rays. At the front of the cylinder a longitudinally extending lens 3 is fixed in suitable manner and adapted to magnify the light rays passing therethrough from the reflecting surface 2, and electric lamps 4 and 5 are supported in sockets 4' arranged within the interior of the reflecting cylinder 1 for illuminating purposes.

A deflecting flange 6 which extends longitudinally the length of the reflecting cylinder is located above the lens for the purpose of deflecting light rays from passing upwardly and directing them downwardly to the roadway in front of the vehicle.

The reflecting cylinder is supported to rotate on its horizontal or longitudinal axis, and for this purpose the opposite ends of the cylinder are provided with exterior trunnions in the shape of spherical heads 7 supported within the outer casing 8. This casing is also cylindrical in shape and its ends are fashioned with bearing sockets 9 of hemi-spherical shape for the accommodation of the heads or trunnions 7. The outer casing also has a hood plate 8' complementary to the deflecting plate 6 of the reflecting cylinder which co-acts as a stop with the deflecting plate to limit the movement of the reflecting cylinder for directing the light rays upwardly. The outer casing has a front opening and its lower wall 9' co-acts with the deflecting plate to prevent excessive movement of the reflecting cylinder for directing the light rays downwardly.

The outer casing is held stationary in front of the radiator cap C by means of a detachable device that includes a pair of angular, horizontally disposed arms 10 and 11 which project outwardly or laterally in front of the cap and are fashioned with end bosses 12 which are complementary to and fit over the bearing sockets of the outer casing. The adjoining inner ends of these angular arms as 13 are perforated for the reception of a clamp bolt 14 and the wing nut 15 is used to clamp the arms together. The two angular arms form the lamp holder, which is adjustable with relation to a supporting bracket comprising a complementary pair of bracket arms 16 and 17 which are adapted to clasp around the exterior of the cap C. The front ends 18 of these bracket arms are perforated for passage of the bolt 13 which is used to secure the lamp holder in adjusted position with relation to the supporting bracket. The supporting bracket is clamped to the cap C by means of a clamp bolt 19 and its wing nut 20, and when thus clamped the bracket comprising the two arms 16 and 17 is rigidly fixed to the cap C, but may readily be detached if desired. By loosening the nut 15 the lamp holder and headlight may be adjusted with relation to the bracket on the pivot bolt 14 to secure the normal adjusted position of the headlight.

Figure 2:
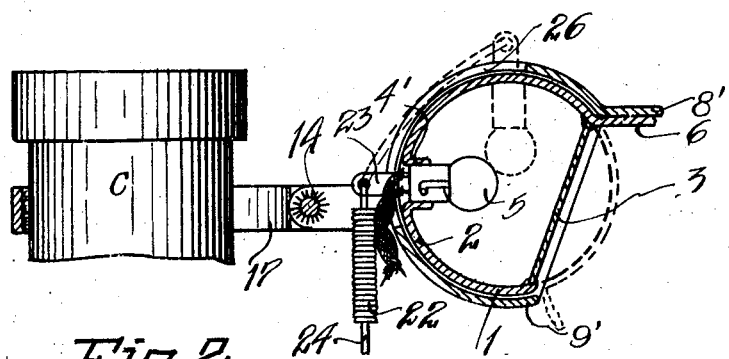
Figure 2 is an enlarged detail, transverse sectional view of the lamp and its supporting members.
Figure 3:
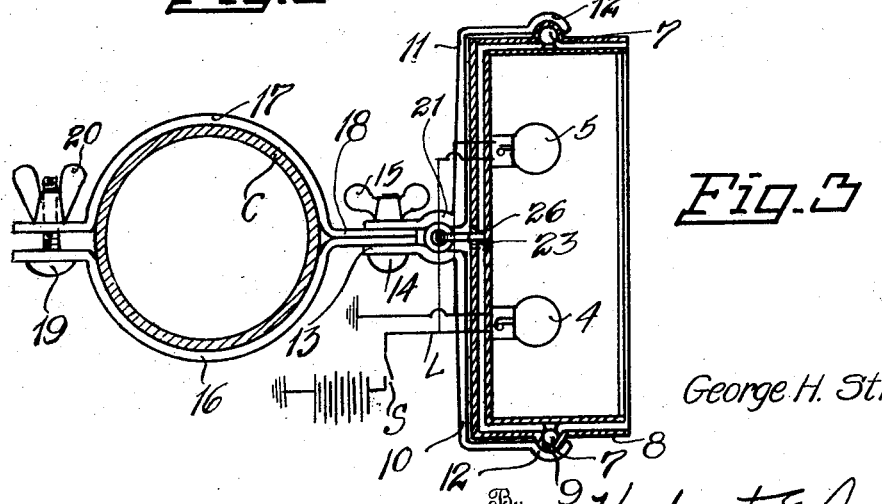
Figure 3 is a plan view of the supporting brackets with the lamp in longitudinal section.

As best seen in Figure 3 the lamp holder comprising the arms 10 and 11 is fashioned with a tubular head 21 between the bolt 14 and the headlight, for the accommodation of a flexible tubular casing 22, and the reflecting cylinder is fashioned with an actuating arm 23 to which a semi-rigid cable 24 is attached. This cable extends up through the tubular casing 22 with one end attached to the actuating arm and its rear end is provided with a handle or knob 25 supported in suitable manner on the dash board or instrument board B of the automobile. The outer casing is fashioned with an arcuate slot 26 of sufficient length to permit movement of the actuating arm 23 when the semi-rigid cable 24 is pushed or pulled to swing the reflecting cylinder on its trunnions as indicated by the full line and dotted positions in Figure 2.

The electric bulbs or lamps are supplied with energy through the light circuits L and a switch S is used for controlling the lights. While I have shown two lamps or electric bulbs in the reflecting cylinder it will be apparent that one lamp or more than two could be used if desired.

It will be apparent that by manipulating the knob or handle 25 the reflecting cylinder may be rotated within the outer casing within limits for the purpose of changing the direction of the light rays emanating from the two electric lamps as heretofore described.

Having thus fully described my invention, what I claim as new and desire to secure by Letters Patent is—

1. The combination with an outer stationary casing having a light opening and supports, of an inner casing movable in said outer casing, illuminating means carried by said inner casing, a lens in said inner casing a hood formed on said inner casing above said lens, means for moving said inner casing within said outer casing, said hood being engageable with the sides of said outer casing light opening to limit the movement of said inner casing in opposite directions.

2. The combination with an outer stationary casing having an opening formed in one side thereof, and an outwardly extending flange formed on said outer casing along one edge of its opening, of an inner casing rotatably disposed in said outer casing, illuminating means carried by said inner casing, means for rotating said inner casing, a lens in said inner casing and adapted to register with the opening of said outer casing, and a hood formed on said inner casing above said lens for registry against said outer casing hood and the opposite side edge of the outer casing open to limit directional rotation of said inner casing.

In testimony whereof I affix my signature.

GEORGE H. STILES.